Sept. 29, 1953   C. A. RASMUSSEN ET AL   2,653,587
VALVE SPRING SURGE DAMPING AND VALVE ROTATING DEVICE
Filed Feb. 18, 1950   2 Sheets-Sheet 1

Inventors
Carlton A. Rasmussen &
Robert T. Doughty
By Willits, Helwig & Baillio
Attorneys

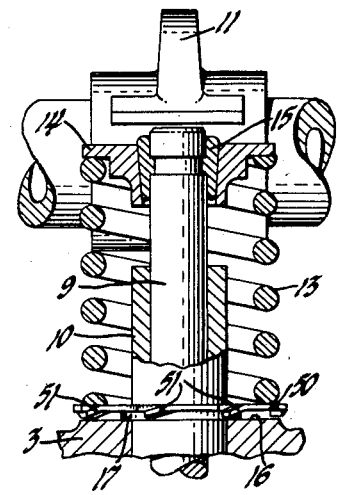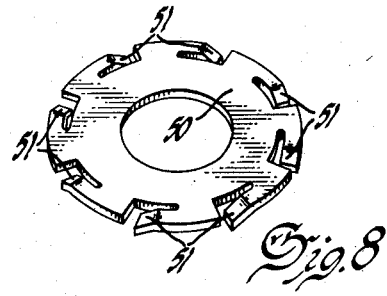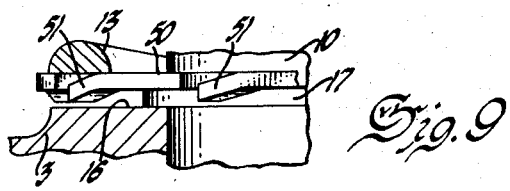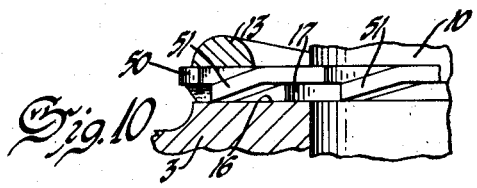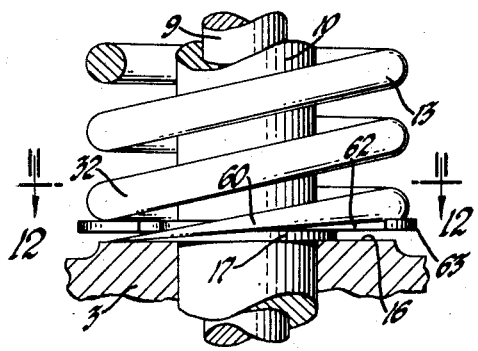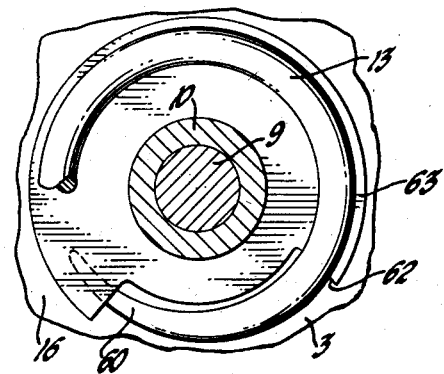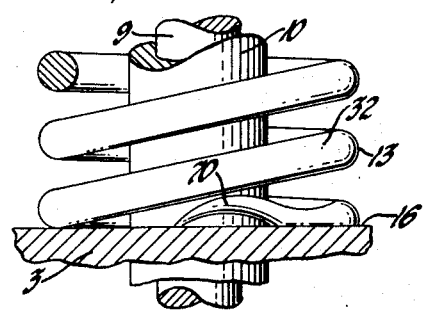

Patented Sept. 29, 1953

2,653,587

UNITED STATES PATENT OFFICE 2,653,587

VALVE SPRING SURGE DAMPING AND VALVE ROTATING DEVICE

Carlton A. Rasmussen and Robert T. Doughty, Detroit, Mich., assignors to General Motors Corporation, Detroit, Mich., a corporation of Delaware Application February 18, 1950, Serial No. 144,948

16 Claims. (Cl. 123—90)

This invention relates to poppet valves for internal combustion engines and the like and more particularly to means for eliminating surge of the valve return springs and effecting rotation of the valves simultaneously with their reciprocation.

The invention is applicable to the usual valve operating mechanism wherein a coil spring concentric with the valve resiliently opposes opening of the valve by a valve rocker or other actuator. The inherent twisting effect of the spring as it is flexed during valve reciprocation serves to provide a rotative force for rotating the valve. With opposite ends of the coil spring abutting the engine frame and a retainer on the valve respectively, this twisting effect causes the valve to rotate in one direction during valve opening and in the opposite direction during valve closing. Various means have heretofore been proposed to control the transmission of rotative force from the spring to the valve during its reciprocation in order to effect an intermittent progressive rotation of the valve in one direction.

It is the principal object of our invention to accomplish this progressive rotation of the valve by means which also serves to damp surge of the spring.

A more specific object of the invention is to damp valve spring surge and provide uni-directional rotation to the valve by the use of a Belleville spring in series thrust relation with the usual coil spring, the Belleville spring having a resistance to rotation about the valve axis which varies in accordance with the direction of axial movement of the valve.

A further object is to provide a seat for one end of the coil spring in the form of a Belleville spring having portions adapted to positively restrain its rotation with its associated end of the coil spring in one direction while accommodating such rotation in the opposite direction.

A still further object of the invention is to provide a resilient and axially rotatable support for one end of the coil spring in the form of a Belleville spring, the rotation of which is controlled by a pawl formed integrally with said end of the coil spring and having a one-way clutching engagement with a stationary part of the engine.

A still further object of the invention is to control the transmission of rotative force from the coil spring to the valve by terminating one end of the spring with a pawl portion movable into one-way clutching relation with the engine frame by an intermediate convolution of the coil spring during spring contraction.

The means by which these and other objects are attained will be readily apparent from a reading of the following description, having reference to the drawings, in which:

Figure 7 is a view similar to Figure 2 but showing a still further modified form of Belleville spring.

Figure 8 is a perspective view of the Belleville spring of Figure 7.

Figures 9 and 10 are further enlarged fragmentary views similar to Figure 7 illustrating the "valve closed" and "valve open" positions of the Belleville spring respectively.

Figure 11 is a view showing a form of our invention utilizing a Belleville spring somewhat similar to that of Figure 6 but with an alternative construction of the coil spring.

Figure 12 is a sectional view taken substantially on line 12—12 of Figure 11.

Figure 13 is a view similar to Figure 6 showing a form of our invention wherein the Belleville spring and spacer are omitted.

Figure 1:
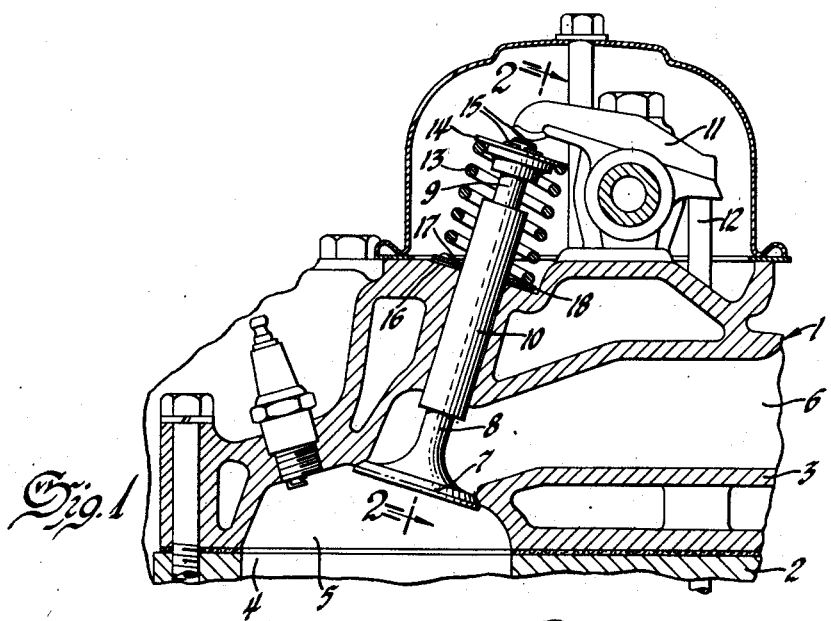
Figure 1 is an elevational sectional view of a portion of an internal combustion engine incorporating a surge damping and valve rotating device in accordance with our invention.
Figure 2:
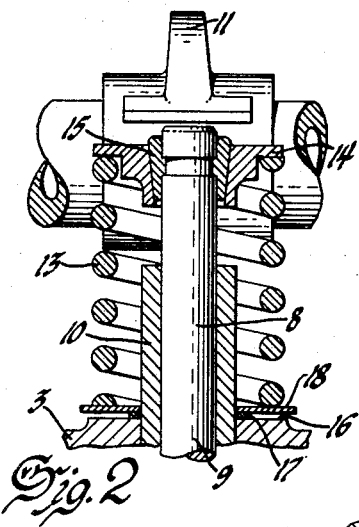
Figure 2 is an enlarged sectional view taken substantially on line 2—2 of Figure 1.
Figure 3:
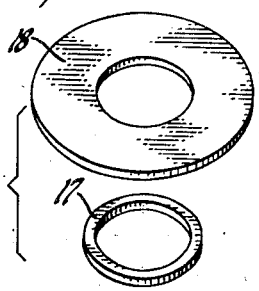
Figure 3 is an enlarged perspective view of the Belleville spring and spacer therefor employed in the form of our invention shown in Figures 1 and 2.

In the drawings referring first to Figures 1–3, there is shown an engine frame designated generally by the numeral 1 including a cylinder block 2 and cylinder head 3, 4 being a cylinder within the block and terminating at its upper end in communication with the combustion chamber 5 formed by the cylinder head. A port 6 within the cylinder head is normally closed at its combustion chamber end by the head 7 of the poppet valve 8. The stem 9 of the valve is slidably supported for axial rotation and reciprocation in a stationary guide 10 fixed in the head 3. Any suitable means for operating the valve may be employed, as for example the rocker 11 driven in well-known manner by a push rod 12 riding on a cam (not shown). The coil spring 13 concentric with the valve stem 9 opposes opening movements of the valve and has one end in abutting and rotative driving relation with a retainer 14 fixedly secured to the stem by conventional split locks 15. The cylinder head 3 is provided with an annular seat 16 about the valve guide 10, on which rests an annular spacer member 17 which is substantially smaller in external diameter than the coil spring 13. Resting on the spacer member 17 and journaled by the guide 10 is a Belleville spring 18 in the form of an annular plate of spring steel or equivalent material on which, in turn, rests the coil spring 13. As will be clear from Figures 2 and 3 the thrust supporting area afforded the Belleville spring by the spacer member 17 has a relatively narrow width and short radius about the valve stem axis, thereby facilitating rotation of the Belleville spring with its associated end of the coil spring 13. Also, while the spacer member 17 is shown as a separate element, it may alternatively be formed integrally with either the Belleville spring, the valve guide 10 or the cylinder head 3.

During operation, the Belleville spring deflects under the force of the coil spring at a rate such that the Belleville spring has a natural frequency interfering with the surge frequency of the coil spring and thereby effects resonant damping of the system. As the coil spring 13 contracts and expands during valve reciprocation its inherent twisting action provides rotative driving forces in opposite directions at its respective ends which are transmitted to the Belleville spring and to the valve through the retainer. When the frictional drag imposed on the Belleville spring by the spacer member 17 exceeds that imposed on the valve stem 9 by its guide 10, the valve rotates; and when the alternative condition exists the Belleville spring rotates. It has been found that when the valve reciprocates at relatively slow speed its rotation is oscillatory in character, but when reciprocated at approximately 1200 cycles per minute and above it rotates intermittently in a progressive or uni-directional manner. This progressive rotation is believed attributable to an out-of-phase relation existing between the vibrating frequencies of the coil and Belleville springs at the higher operating speeds, causing an intermittent increase and decrease in the thrust load imposed on the spacer member 17, the increased thrust loads producing increased frictional drag effects on the Belleville spring in timed relation with the change in direction of the rotative forces transmitted to the Belleville spring by the coil spring.

Figure 4:
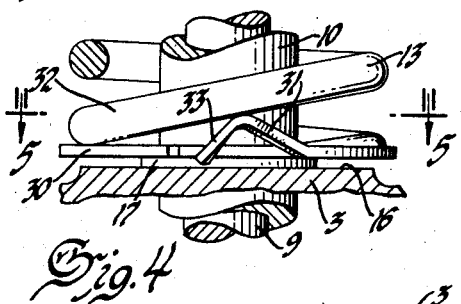
Figure 4 is a further enlarged fragmentary elevational view similar to Figure 2 but showing a modification of the Belleville spring.
Figure 5:
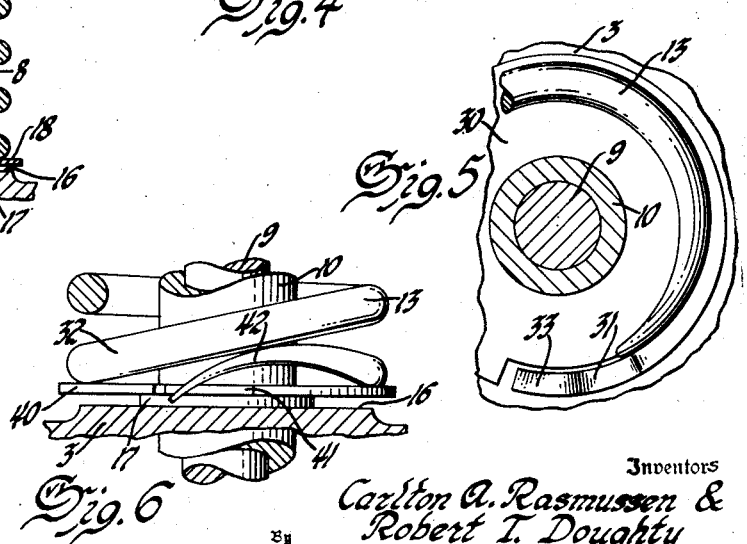
Figure 5 is a sectional view taken substantially on line 5—5 of Figure 4.

As a means of insuring the progressive rotation of the valve at low operating speeds as well as at high speeds, we have modified the Belleville spring as shown in Figures 4 and 5. This Belleville spring 30 has a lanced out portion 31 adjacent its outer periphery which is bent up to abut the convolution 32 of the coil spring axially adjacent thereto. The lanced out portion 31 terminates in a downwardly inclined pawl 33 which just clears the seat 16 on the cylinder head when the valve is open. As the valve is moved toward open position the deflection of the Belleville spring 30 carries the pawl 33 into one-way braking engagement with the seat 16, the spring convolution 32 serving to assist this movement of the pawl as the coil spring contracts. The Belleville spring 30 functions in the same manner as that of the previously described Belleville spring 18 in damping surge of the coil spring 13.

Figure 6:
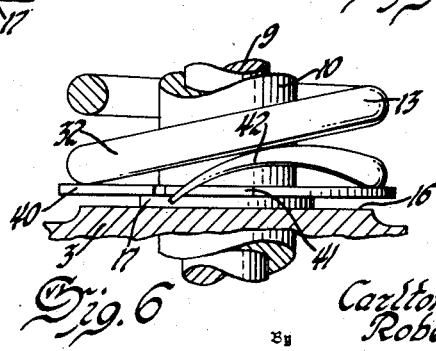
Figure 6 is a view similar to Figure 4 but showing a modified arrangement of the Belleville spring and its associated end of the coil spring.

In Figure 6 we show an alternative arrangement for obtaining similar positive braking wherein the Belleville spring 40 is provided with a slot 41 in its outer edge portion. The pawl 42 in this modification is formed by tapering the end of the coil spring 13 and arranging it to extend through the slot 41 into engagement with the seat 16 as the valve is opened. In order to increase the engagement pressure between the pawl 42 and the seat 16 when the valve is opened, the pawl is given a curvature as shown to place it in abutment with the coil spring convolution 32 axially adjacent thereto.

In Figures 7–10 we show an alternative Belleville spring construction in which the spring 50 is provided with a plurality of circumferentially spaced lanced out portions 51 somewhat similar to the portion 31 shown in Figure 4. The lanced out portions 51 however do not abut an intermediate convolution of the spring but merely depend angularly from the Belleville spring toward the seat 16. When the valve is in closed position as shown in Figure 9, the lanced out portions 51 terminate in slight spaced relation from the seat 16 and during opening of the valve the flexure of the Belleville spring 50 carries them downwardly into one-way braking engagement with the seat 16 as illustrated in Figure 10. Since the Belleville spring 50 has freedom to flex in response to valve opening and closing, it produces the same surge damping effect on the valve return springs as previously described.

In Figure 11 is shown an arrangement somewhat similar to that of Figure 6, but differing therefrom in that the pawl 60 is formed by terminating the coil spring 13 with a sharpened end which parallels the axially adjacent convolution 32. A sufficiently long slot 62 is provided in the outer marginal edge of the Belleville spring 63 to allow the pawl 60 to pass therethrough into contact with the seat 16. In this construction the pawl 60 remains in constant contact with the seat 16 and serves to limit rotation of the Belleville spring to one direction at all times.

Figure 13 illustrates an application of the valve rotating feature of our invention where the need for damping valve spring surge is unnecessary. In this form the Belleville spring and spacer are omitted and rotation of the coil spring on the seat 16 is limited to one direction by means of the pawl 70 which is formed integrally with the coil spring 13. It will be noted that the pawl 70 differs principally from pawl 42 of Figure 6 in that while pawl 70 is subjected to pressure by its axial adjacent spring convolution 32 during valve opening, it is arranged to be spaced slightly therefrom when the valve is in closed position (as shown). The pawl 70 preferably is arranged to exert no appreciable pressure against the seat 16 when the valve is fully closed, thereby accommodating rotation of the spring in either direction on the seat 16 during the initial opening and final closing movements of the valve. As the degree of valve opening increases, however the spring convolution 32 moves into engagement with the pawl 70 forcing it firmly against the seat 16 and limiting rotation of that end of the spring to one direction.

We claim:

1. In an internal combustion engine or the like, a frame, a poppet valve supported thereby for rotation and reciprocation, means for reciprocating the valve including a valve return spring having two portions which rotate in opposite directions to one another about the axis of rotation of the valve during valve reciprocation, said spring being connected to the valve for movement of one of said portions therewith, and a member in resiliently yieldable thrust transmitting relation between the other portion of the spring and the frame, said member being rotatable with said other portion and having a connection with the frame accommodating its rotation in one direction about the valve axis under relatively light thrust loads and opposing its rotation in the opposite direction under relatively heavy thrust loads.

2. In an internal combustion engine or the like, a frame, a poppet valve mounted therein for rotation and reciprocation, means for reciprocating the valve including a coil return spring concentric with and operatively fixed at one of its ends thereto, and a resiliently yieldable abutment for the opposite end of the spring on the frame, said abutment being rotatable with the opposite end of the spring and having a one-way rotary clutching engagement with the frame.

3. In an internal combustion engine or the like, a frame, a poppet valve slidably supported thereby for rotation and reciprocation, and valve reciprocating means including a return spring means having portions which rotate relative to each other about the axis of rotation of the valve when the valve is reciprocated, one of said spring portions being movable with the valve, the other of said spring portions forming a one-way rotary clutch engageable with the frame.

4. In an internal combustion engine or the like, an engine frame, a poppet valve mounted for rotation and reciprocation including a stem having an abutment, valve reciprocating means including a coil spring concentric with the stem and compressed endwise between the abutment thereon and the frame, a Belleville type spring frictionally engaging the frame end of the coil spring, and an annular ring spacing the Belleville spring from the frame, said ring being concentric with and substantially smaller in diameter than the coil spring to accommodate rotation of the Belleville spring relative to the frame.

5. In an internal combustion engine or the like, an engine frame, a poppet valve mounted for reciprocation and rotation therein including a stem, valve reciprocating means including a coil compression spring concentric with the stem, a seat on the stem for one end of the spring, a resiliently yieldable member located opposite and frictionally engaging the other end of the spring, and means spacing said yieldable member from the frame and controlling their relative rotation during flexure of the spring in response to reciprocation of the valve.

6. The combination with a poppet valve, guide means accommodating its rotation and reciprocation, and valve reciprocating means including a valve return spring arranged coaxially of the valve, of a second spring journalled by the guide means and in series thrust transmitting relation with one end of the return spring, and a member thrustably and rotatably supporting the second spring and accommodating both its deflection underload and its rotation with said end of the return spring during reciprocation of the valve.

7. In an internal combustion engine, an engine frame, a poppet valve mounted for reciprocation and rotation therein including a stem, valve reciprocating means including a coil compression spring concentric with the stem and having one of its ends secured to the stem, an annular resiliently yieldable plate frictionally engaging and spacing the opposite end of the spring from the frame and having an inner diameter substantially smaller than the spring diameter, and a member spacedly supporting the plate adjacent its inner diameter from the frame and frictionally controlling rotation of the plate with its end of the spring.

8. The combination with a poppet valve having a stem, guide means for the stem accommodating rotation and reciprocation of the valve, and a coil compression spring concentric with the stem and normally holding the valve closed, of a second spring in tandem with the coil spring consisting of an annular plate having an inner diameter substantially smaller than the diameter of the coil spring, means thrustably supporting said plate adjacent its inner diameter and accommodating both its rotation on the guide means and its flexure longitudinally of the valve stem under thrust loads imposed by the coil spring, portions of said plate outwardly of its supporting means being engageable with the guide means during valve opening movements to oppose rotation of the plate in one direction and accommodate its rotation in the opposite direction.

9. The combination with an engine having a frame and a poppet valve with a stem slidably mounted therein for rotation and reciprocation, of a coil compression spring concentric with the stem and normally holding the valve in closed position, a Belleville spring in thrust transmitting relation between the coil spring and the frame, anti-friction means accommodating rotation and flexure of the Belleville spring relative to the frame during valve opening and closing, said Belleville spring having a portion slidably engaging an intermediate convolution of the coil spring and movable thereby into contact with the frame as the coil spring is contracted by the opening movement of the valve, said portion being effective when in contact with the frame to restrain rotation of the Belleville spring in one direction while accommodating its rotation in the opposite direction.

10. The combination with an engine having a frame and a poppet valve mounted therein for rotation and reciprocation, of a coil compression spring urging the valve closed and having one end rotatable therewith, surge dampening means for the coil spring in the form of a Belleville spring in thrust transmitting relation between its opposite end and the frame, supporting means for the Belleville spring accommodating its rotation relative to the frame with said opposite end of the coil spring during valve opening and closing, said opposite end of the coil spring terminating in a pawl portion ratchetable on the frame to limit rotation of the Belleville spring and said opposite end of the coil spring to one direction.

11. The invention defined in claim 10 with said pawl portion being movable into ratcheting engagement with the frame by the convolution of said coil spring axially adjacent said pawl portion.

12. The invention defined in claim 10 with said Belleville spring having a slot through which the pawl portion projects.

13. The invention defined in claim 10 with said pawl portion being disposed substantially parallel to the coil spring convolution axially adjacent thereto.

14. In an engine, an engine frame, a poppet valve guided for rotation and reciprocation therein, a coil compression spring concentric with and biasing the valve closed, said spring having one of its ends operatively fixed to the valve and its other end in abutment with the frame, said other end terminating in a frame engageable pawl accommodating axial rotation of said other end in one direction only.

15. The invention defined in claim 14, wherein said pawl is urged against the frame by the convolution of the spring axially adjacent the pawl as the spring contracts during opening movements of the valve.

16. In an internal combustion engine or the like, a frame, a poppet valve slidably supported thereby for rotation and reciprocation, and valve reciprocating means including a return spring means having portions which rotate relative to each other about the axis of rotation of the valve when the valve is reciprocated, one of said spring portions being movable with the valve, the other of said spring portions having a secondary spring means rotatable therewith and forming a one-way rotary clutch engageable with the frame.

CARLTON A. RASMUSSEN.
ROBERT T. DOUGHTY.

References Cited in the file of this patent

UNITED STATES PATENTS

| Number | Name | Date |
| --- | --- | --- |
| 1,534,476 | Wirrer | Apr. 21, 1925 |
| 1,960,709 | Olenick | May 29, 1934 |
| 2,117,433 | Krebs | May 17, 1938 |
| 2,117,434 | Krebs | May 17, 1938 |
| 2,397,502 | Ralston | Apr. 2, 1946 |